United States Patent

[11] 3,548,757

| [72] | Inventor | Adriaan Verheij<br>Rotterdam, Netherlands |
|---|---|---|
| [21] | Appl. No. | 825,018 |
| [22] | Filed | May 15, 1969 |
| [45] | Patented | Dec. 22, 1970 |
| [73] | Assignee | N.V. H. Verheij's Machines<br>Rotterdam, Netherlands,<br>a corporation of the Netherlands |

[54] ROLLER FOR BREAD MAKING MACHINES
2 Claims, 1 Drawing Fig.

[52] U.S. Cl. .................................................. 107/12,
107/9
[51] Int. Cl. .................................................. A21c 3/02
[50] Field of Search.......................................... 107/2, 9,
12, 34; 18/9, 10

[56] References Cited
UNITED STATES PATENTS

| 2,116,930 | 5/1938 | Kirchhoff..................... | 107/9 |
| 2,145,550 | 1/1939 | Loose........................... | 107/2 |
| 2,195,346 | 3/1940 | Verheij......................... | 107/12 |
| FOREIGN PATENTS |
| 71,994 | 3/1953 | Netherlands................ | 107/12 |

*Primary Examiner*—Henry S. Jaudon
*Attorney*—Warren, Rubin, Brucker & Chickering ABSTRACT: A roller for a bread making machine is provided with circumferential helical grooves extending from the middle of the roller towards its ends in opposite senses of rotation and having a gradually decreasing pitch and depth from the middle of the roller towards its ends. Slabs of dough rolled out by the roller have a virtually straight trailing edge, which provides for a straight lock when the slabs are rolled up to form loaves.

PATENTED DEC 22 1970 3,548,757
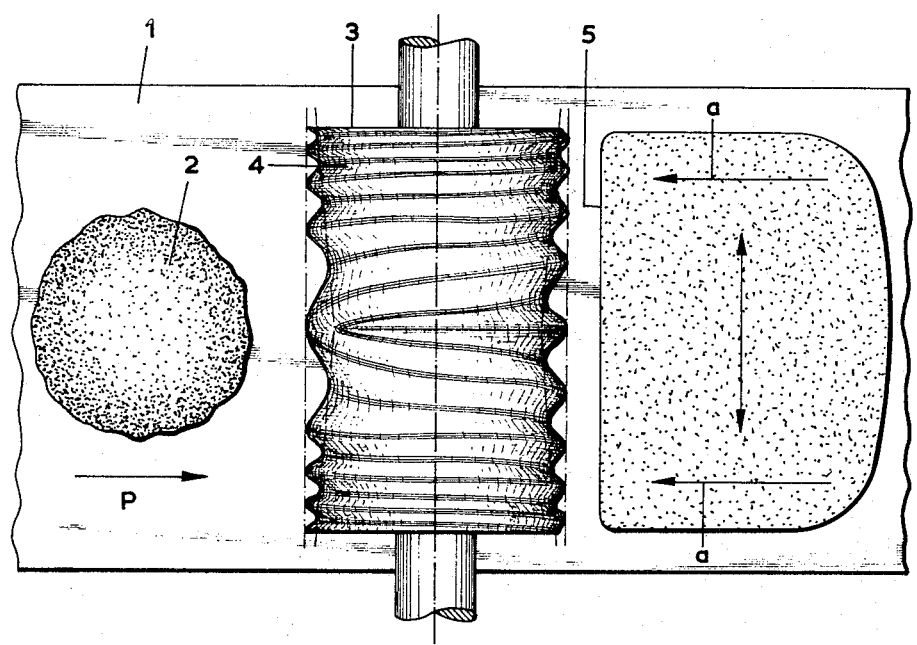
INVENTOR.
Adriaan Verheij
Warren, Rubin,
Brucker & Chickering
His Attorneys.

ROLLER FOR BREAD MAKING MACHINES

This invention relates to a cylindrical roller for use in bread making machines, of the kind whose circumference is provided with helical grooves extending from the middle of the roller to its two ends in opposite senses of rotation.

A bread making machine incorporating one or more of such rollers, which are known in the art, produces favourable results, but has the disadvantage that the trailing edge of the rolled-out balls of dough presents a convex, semielliptical configuration. As a result, when the rolled-out slab of dough is rolled up, a curved lock is obtained rather than a straight one as is produced in making bread by hand.

It is an object of the present invention to remove this drawback by means of an improved construction of a roller of the subject kind, thereby to produce a straight lock which meets all requirements in the mechanical making of bread dough, so that in that respect, too, the making of bread dough by hand is equaled.

To that effect a roller according to the invention is characterized in that the pitch and the depth of the grooves in the circumferential surface of the roller gradually decrease from the middle of the roller towards its two ends. In addition the width of the grooves may also gradually decrease from the middle of the rollers to its two ends.

One embodiment of the invention will be described, by way of example, with reference to the accompanying drawing, which shows a diagrammatic plan view of a part of a bread making machine.

Referring to the drawing, there is shown a cylindrical roller 3 extending across a conveyor belt 1 for successively supplying dough balls 2 in the direction of the arrow P. The circumferential surface of the roller 3, which is adjustable relative to the conveyor belt, is provided with helical grooves 4 extending from the middle of the roller towards its ends in opposite senses of rotation. Both the pitch and the depth of the grooves gradually decrease from the middle of the roller towards its ends. As a result, each dough ball 2 passed under the roller 3 by the conveyor belt for it to be rolled, will not only be rolled out to the required extent transversely of the direction of transport, but in the direction of transport it will be rolled out more strongly at the end portions of the roller than in the middle, as indicated by the arrows $a$. It is thus achieved that the trailing edge 5 of the flattened dough ball will have virtually rectilinear configuration, so that after the flattened dough ball has been rolled up, the lock of the roll of dough, constituted by said trailing edge 5, will also have a virtually rectilinear configuration.

The good operation of the roller can be promoted if the width of the grooves 4 gradually decreases from the middle of the roller towards its two ends.

In order that the dough to be rolled out is as much as possible subjected to a uniform treatment, it is recommendable for the adjacent grooves to merge into one another in sinuate form as seen lengthwise of the roller.

I claim:

1. A roller for a bread making machine, whose circumference is provided with helical grooves extending from the middle of the roller to its two ends in opposite senses of rotation, characterized in that the pitch and the depth of the grooves in the circumferential surface of the roller gradually decrease from the middle of the roller towards its ends.

2. A roller according to claim 1, wherein the width of the grooves in the circumferential surface of the roller gradually decreases from the middle of the roller towards its ends.